United States Patent Office 3,224,873
Patented Dec. 21, 1965

3,224,873
LIQUID-LIQUID RECOVERY OF COPPER VALUES
USING α-HYDROXY OXIMES
Ronald R. Swanson, Minneapolis, Minn., assignor to General Mills, Inc., a corporation of Delaware
No Drawing. Filed Feb. 25, 1963, Ser. No. 260,848
20 Claims. (Cl. 75—101)

This invention relates to the recovery of copper values from aqueous solutions and in particular to a liquid-liquid ion exchange extraction process employing certain hydroxy oxime extractants.

The mining of copper is one of man's oldest occupations, as its practice was known before the dawn of recorded history. At first the only deposits which could be utilized were those containing the native metal. As technology advanced, more and more ores became amenable to processing including ores containing relatively small amounts of copper oxide and those containing large amounts of alkaline gangue such as limestone and/or dolomite.

Present processing of low grade copper oxide ores entails the leaching of these ores with dilute sulfuric acid or ferric sulfate. This leaching yields a copper sulfate solution from which the copper is recovered by cementation, or if it is a pure enough solution, by electrolysis. This process is practiced on a large scale in the world today.

If the ore contains a large amount of limestone and/or dolomite or other acid consuming constituents, the acid leaching process is not applicable since excessive amounts of the acid are needed to neutralize such impurities. In the early part of this century a process was developed whereby these ores could be economically treated for the recovery of copper. This process is known as ammonia leaching and has been practiced industrially. In such a process the ore is ground and then leached with a dilute solution of ammonia and ammonium carbonate. The copper is selectively removed from the ore as the $Cu(NH_3)_4^{++}$ ion. This strong liquor is then stripped of ammonia and ammonium carbonate by distillation which causes the copper to precipitate as the oxide. The oxide is converted by smelting to copper metal while the distillate is recovered and used to leach further quantities of ore.

While the above-described process is the only known economical method for recovering copper from high lime ores, it has many disadvantages. Only a minimum of washing liquor can be tolerated because this liquor when added to the leach liquor causes a considerable drop in the copper concentration. This in turn leads to the situation of either losing large amounts of ammonia values in the leached gangue or results in such a dilute liquor that it is uneconomical to distill it to recover the copper oxide. In addition the copper is recovered as the oxide rather than the metal. Since the oxide must be converted to the metal to be saleable, an additional smelting expense is involved.

I have now discovered that copper values can be recovered from aqueous solutions with certain α-hydroxy oximes. Broadly, the process of the present invention comprises contacting a copper containing aqueous solution with a water immiscible organic phase comprising a hydrocarbon solvent and the α-hydroxy oxime compound whereby the copper values are preferentially extracted into the organic phase. The loaded organic phase is separated from the aqueous solution by virtue of their immiscibility. The copper values can then be recovered from the loaded organic phase by various procedures including contacting said loaded organic phase with an aqueous stripping medium or by hydrogenation of the copper-α-hydroxy oxime complex directly. My process is particularly suitable for the recovery of copper values from acid or ammonical leach liquors which liquors may be either strong or dilute.

It is, therefore, an object of the present invention to provide a novel process for the recovery of copper values from aqueous solutions.

It is also an object of this invention to provide such a process for the recovery of said values from acid or ammonical leach liquors.

It is a further object of the invention to provide a process whereby copper values may be recovered from aqueous solutions containing other metal values or contaminants.

These and other objects will become apparent from the following detailed description.

The α-hydroxy oxime extractants used in the present invention have the following general formula:

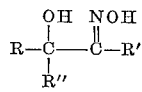

where R, R' and R" may be any of a variety of organic hydrocarbon radicals such as aliphatic and alkylaryl radicals. R" may also be hydrogen. Preferably, R and R' are unsaturated hydrocarbon or branched chain alkyl groups containing from about 6 to 20 carbon atoms. R and R' are also preferably the same and when alkyl are preferably attached to the carbons substituted with the —OH and =NOH groups through a secondary carbon atom. It is also preferred that R" is hydrogen or unsaturated hydrocarbon or branched chain alkyl groups containing from about 6 to 20 carbon atems. The α-hydroxy oximes also preferably contain a total of about 14 to 40 carbon atoms. Representative compounds are 19-hydroxyhexatriaconta-9,27-dien-18-oxime, 5-10-diethyl-8-hydroxytetradecan-7-oxime, and 5,8-diethyl-7-hydroxy-dodecane-6-oxime. The latter compound has the following structural formula:

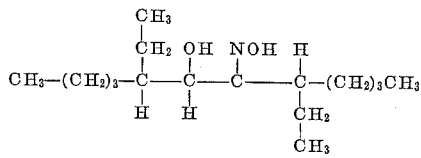

Representative of other mono- and polyunsaturated radicals are heptenyl, octenyl, decenyl, octadecenyl, octadecynyl and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like.

The α-hydroxy oxime extractants are also characterized as having a solubility of at least 2% by weight in the hydrocarbon solvent used to make up the organic phase and substantially complete insolubility in water. In addition, it is believed that the copper values and the α-hydroxy oxime extractant form a complex during the initial extraction step and such complex, when formed, should also have a solubility of at least 2% by weight in the hydrocarbon solvent. Although I do not wish to be bound by the following theory, it is believed that the extraction proceeds through the formation of a complex, for example, in the following manner:

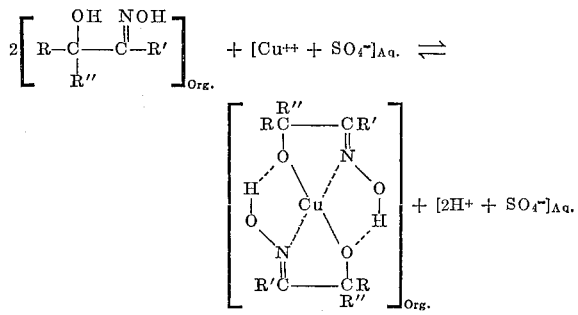

The α-hydroxy oximes are prepared by reacting an acyloin with a hydroxylamine salt under reflux conditions. Such reaction can be carried out by refluxing the reactants in an alcohol such as ethanol and adding pyridine to combine with the acid associated with the hydroxylamine. This preparation procedure is illustrated by the following examples.

EXAMPLE A

Into a 1 liter flask equipped with a reflux condenser were charged 106.6 g. (0.4 mole) 5,8-diethyl-7-hydroxy-dodecan-6-one, 55.6 g. (0.8 mole) hydroxylamine hydrochloride, 250 ml. pyridine and 250 ml. absolute ethanol. The reaction mixture was heated to reflux and held under reflux conditions for 3 hours. The crude mixture, after cooling overnight, was added to 1 liter of water along with 500 ml. ether. The aqueous layer was discarded and the ether layer washed 4 times with water, 2 times with a 3% HCl solution and 4 more times with water. The ether layer was dried and then stripped of ether under vacuum to leave a quantitative yield of a water white product which was 5,8-diethyl-7-hydroxydodecan-6-oxime.

EXAMPLE B

Example A was repeated usisng 49.3 g. (0.0925 mole) 19-hydroxyhexatriaconta-9,27-dien-18-one (i.e., the acyloin derived from oleic acid), 25.0 g. (0.36 mole) hydroxylamine hydrochloride, 125 ml. pyridine and 125 ml. absolute ethanol. The reaction mixture was refluxed for 1¾ hours and then treated as in Example A. There was obtained 42.0 g. 19-hydroxyhexatriaconta-9,27-dien-18-oxime.

EXAMPLE C

Example A was repeated using 124.6 g. (0.4 mole) isodecanoin (i.e., the acyloin derived from the branched chain decanoic acids obtained in the Oxo process), 54.8 g. (0.8 mole) hydroxylamine hydrochloride, 300 ml. pyridine and 300 ml. absolute ethanol. The reaction mixture was refluxed for 2 hours and then treated as in Example A. There was obtained 109.6 g. of a dark yellow liquid which consisted of 97% by weight of a mixture of α-hydroxy oximes having the formula:

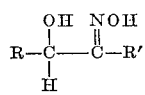

where R and R' are mixed branched chain alkyl groups containing 9 carbon atoms.

Other suitable α-hydroxy oxime extractants can be prepared by reacting the appropriate acyloin compound with the hydroxylamine salt. It is also preferred to use an excess of the salt which may be the hydrochloride or other salts such as acid sulfate and the like.

In addition to the above-described α-hydroxy oxime compounds, the organic phase comprises a liquid hydrocarbon solvent. Such solvent must, of course, be water immiscible so as to be separable from the aqueous solutions originally containing the copper values. Suitable solvents include aliphatic and aromatic hydrocarbons such as benzene, toluene, xylene, Skellysolve B, fuel oil and kerosene. Generally, the α-hydroxy oxime extractant will be present in the organic phase in an amount sufficient to extract at least a portion of the copper values from the aqueous solutions. Preferably the oxime will be present in an amount of from about 2 to about 50% by weight based on the total organic phase with an amount of from 2 to 15% by weight being particularly preferred.

The organic phase may also contain other materials such as a conditioner which typically is a long chain aliphatic alcohol such as capryl alcohol, isodecanol, tridecyl alcohol or 2-ethyl hexanol. If the conditioner is present in the organic phase, it will be used in amounts of from about 0.5 to 10 weight percent.

As indicated above, the copper values can be stripped from the loaded organic phase by employing an aqueous solution of a strong acid. Suitable acids include mineral acids such as sulfuric acid, hydrochloric acid and the like. The organic phase can also be stripped by alternately contacting said phase with the aqueous solution containing an acid and with water. Copper metal can be recovered from the copper-pregnant stripping medium by direct electrolysis. This eliminates completely the smelting step used in previous processes for the recovery of copper from ammonical leach liquors.

Since the concentration of copper in the extract phase can be varied simply by varying the ratio of the organic and aqueous phases, the problem of low copper concentration in the original copper containing aqueous solutions is obviated. And inasmuch as the copper can be stripped from the loaded organic phase by strong acids into a small volume of aqueous stripping medium, a further concentration of copper values can be effected.

Copper metal can also be recovered from the loaded organic phase by hydrogenating the copper-pregnant organic phase. When using such procedure, no stripping of the copper values from the loaded organic phase and no electrolysis step is needed.

Copper values can also be recovered in the form of salts. Thus when sulfuric acid is used as the stripping solution, copper sulfate can be crystallized from the copper-pregnant stripping solution. The volume of the stripping medium is kept low and usually warmer than ambient room temperature so as to obtain a pregnant solution high in copper values. The copper salt then crystallizes out in the strip stage(s) if a high enough concentration is obtained. It may also be crystallized apart from the organic by cooling to ambient temperature or below. Additionally, such salts can be recovered by evaporation of the stripping solution. Copper salts such as copper sulfate are valuable products and can be obtained in high purity by my process.

The liquid-liquid extraction process of the present invention can be carried out on a single stage batch basis or in a continuous counter-current mixer-settler unit. The number of stages can be varied as desired, depending on the efficiency of extraction and stripping, when employed. It has been found that as much as 99.7% of the copper values can be recovered from an ammonical liquor in a continuous process utilizing a mixer-settler circuit consisting of one stage extraction and six stages of stripping.

The invention is further described by the following examples. Said examples are illustrative only and do not constitute limitations on the invention.

EXAMPLE I

Ten milliliter portions of an aqueous feed solution (0.033 M $CuSO_4$ and 0.5 M $Na_2SO_4$) were extracted with 20 milliliter portions of 0.1 molar solutions of 5,8-diethyl-7-hydroxydodecan-6-oxime in kerosene. Varying amounts of $NaHSO_4$, $NaHCO_3$ and $Na_2CO_3$ solutions were added to the different separatory funnels containing the aqueous feed solutions for pH control. In each case, however, the total aqueous phase volume was 15 milliliters after such additions. The extractions were performed on a single stage batch basis at ambient room temperature. The organic solvent was first added to the funnels followed by addition of the aqueous feed solution and then the $NaHSO_4$, $NaHCO_3$, or $Na_2CO_3$ solutions. The funnels were shaken to equilibrate the mixtures and then the phases were allowed to separate. The aqueous phase was analyzed for residual copper and the pH thereof was also measured. The results are set forth in the following Table I.

Table I

| Extraction No. | pH | [Cu++] Aq. (moles/l.) | [Cu++] Org. (moles/l.) | Percent Cu++ extracted |
|---|---|---|---|---|
| 1 | 2.63 | 0.032 | 0.0007 | 3.0 |
| 2 | 2.78 | 0.029 | 0.00305 | 12.1 |
| 3 | 2.88 | 0.026 | 0.00525 | 21.2 |
| 4 | 2.96 | 0.022 | 0.00825 | 33.3 |
| 5 | 3.06 | 0.015 | 0.0131 | 53.0 |
| 6 | 3.21 | 0.0105 | 0.0173 | 70.0 |
| 7 | 3.39 | 0.005 | 0.021 | 85.0 |
| 8 | 4.59 | (1) | 0.0245 | 100.0 |

[1] 2 p.p.m.

The above data show that the process of the present invention is very valuable for the extraction of copper values from aqueous solutions over a reasonable pH range. Moreover, as the following data illustrate, the process is highly selective where copper values are to be recovered from solutions containing other metal values such as nickel, cobalt and/or zinc.

EXAMPLES II–IV

Example I was repeated except that the following aqueous feed solutions were substituted for the aqueous feed solution of Example I:

Exp. II—0.0954 M $NiSO_4$ and 0.5 M $Na_2SO_4$
Exp. III—0.104 M $CoSO_4$ and 0.5 M $Na_2SO_4$
Exp. IV—0.100 M $ZnSO_4$ and 0.5 M $Na_2SO_4$ The extraction results are set forth in the following Tables II, III and IV, respectively.

Table II

| Extraction No. | pH | [Ni++] Aq. (moles/l.) | [Ni++] Org. (moles/l.) | Percent Ni++ [1] extracted |
|---|---|---|---|---|
| 1 | 3.05 | 0.0655 | 1.4×10⁻⁵ | 0.03 |
| 2 | 4.49 | 0.064 | 1.2×10⁻⁴ | 0.25 |
| 3 | 6.29 | 0.0635 | 2.5×10⁻⁴ | 0.54 |
| 4 | 7.07 | 0.0595 | 0.0061 | 13.2 |
| 5 | 7.17 | 0.0505 | 0.0098 | 20.8 |
| 6 | 7.47 | 0.0405 | 0.0168 | 35.8 |

[1] Based on analysis of the organic phase.

Table III

| Extraction No. | pH | [Co++] Aq. (moles/l.) | [Co++] Org. (moles/l.) | Percent Co++ [1] extracted |
|---|---|---|---|---|
| 1 | 2.89 | 0.070 | 9.5×10⁻⁶ | 0.018 |
| 2 | 3.54 | 0.0695 | 2×10⁻⁵ | 0.096 |
| 3 | 5.98 | 0.068 | 2.6×10⁻³ | 5.0 |
| 4 | 6.79 | 0.0625 | 6.3×10⁻³ | 12.1 |
| 5 | 7.12 | 0.054 | 0.0126 | 24.2 |
| 6 | 7.51 | 0.043 | 0.0190 | 36.5 |

[1] Based on analysis of organic phase.

Table IV

| Extraction No. | pH | [Zn++] Aq. [1] (moles/l.) | [Zn++] Org. (moles/l.) | Percent Zn++ extracted |
|---|---|---|---|---|
| 1 | 2.99 | 0.0678 | 0.0 | 0.0 |
| 2 | 5.02 | 0.0670 | 1.2×10⁻⁵ | 0.024 |
| 3 | 6.49 | 0.0643 | 1.9×10⁻³ | 3.8 |
| 4 | 6.62 | 0.0596 | 2.1×10⁻³ | 4.2 |
| 5 | 6.68 | 0.0498 | 1.4×10⁻³ | 2.8 |
| 6 | 6.78 | 0.0338 | 0.93×10⁻³ | 1.8 |

[1] The continual drop in concentration is due to precipitation of the zinc from the system.

By comparing the above data with those of Example I, it will be seen that it is possible to secure an excellent separation of the copper from the other metal values by suitably selecting the pH range to be used in the extraction.

EXAMPLE V

An aqueous ammonical feed solution, simulating a liquor of possible commercial importance was made up as follows:

$CuSO_4 \cdot 5H_2O$ _____ 38.1 gm.
29% $NH_3$ _____ 34.5 gm. (10 gm. $NH_3$).
$NH_4CO_3$ _____ 20.0 gm.
$H_2O$ _____ To 1 l.

The feed solution analyzed 0.1575 M $Cu^{++}$ and had a pH of 9.92.

This feed solution was contacted, by shaking in separatory funnels, with 0.1, 0.2 and 0.4 molar solutions of 5,8-diethyl-7-hydroxydodecan-6-oxime. The extractions were also carried out at varying organic:aqueous volume phase ratios. Separation of the phases followed by analysis gave the data as set forth in the following Table V.

Table V

| Extraction No. | Organic Phase Molarity | Org./Aq. Phase Ratio | At Equilibrium (moles/l.) | |
|---|---|---|---|---|
| | | | [Cu++] Aq. | [Cu++] Org. |
| 1 | 0.1 | 8 | 0.000118 | 0.0197 |
| 2 | 0.1 | 4 | 0.000197 | 0.0393 |
| 3 | 0.1 | 2 | 0.026 | 0.0658 |
| 4 | 0.1 | 1.33 | 0.068 | 0.0672 |
| 5 | 0.1 | 1 | 0.095 | 0.0625 |
| 6 | 0.1 | 0.67 | 0.109 | 0.0728 |
| 7 | 0.2 | 4 | 0.00094 | 0.0394 |
| 8 | 0.2 | 2 | 0.000121 | 0.0787 |
| 9 | 0.2 | 1 | 0.026 | 0.132 |
| 10 | 0.2 | 1.33 | 0.067 | 0.136 |
| 11 | 0.2 | 0.5 | 0.087 | 0.141 |
| 12 | 0.2 | 0.33 | 0.107 | 0.152 |
| 13 | 0.4 | 2 | 0.000063 | 0.0787 |
| 14 | 0.4 | 1 | 0.000063 | 0.157 |
| 15 | 0.4 | 0.5 | 0.027 | 0.261 |
| 16 | 0.4 | 0.33 | 0.067 | 0.272 |
| 17 | 0.4 | 0.25 | 0.087 | 0.282 |
| 18 | 0.4 | 0.167 | 0.108 | 0.297 |

The above data show that excellent extraction of copper values from ammonical solutions is obtained using the process of the present invention.

EXAMPLES VI–VIII

Example V was repeated except that the following aqueous ammonical feed solutions were substituted for the feed solution of Example V.

Exp. VI:
    $CuCl_2 \cdot 2H_2O$ _____ 2.68 gm.
    29% $NH_3$ _____ 5.17 gm.
    $NH_4Cl$ _____ 2.23 gm.
    $H_2O$ _____ To 100 ml.
Exp. VII:
    $CuSO_4 \cdot 5H_2O$ _____ 3.93 gm.
    29% $NH_3$ _____ 5.17 gm.
    $(NH_4)_2SO_4$ _____ 2.75 gm.
    $H_2O$ _____ To 100 ml.

Exp. VIII:
- Cu(NO₃)₂·3H₂O _____ 3.79 gm.
- 29% NH₃ _____ 5.17 gm.
- NH₄NO₃ _____ 3.34 gm.
- H₂O _____ To 100 ml.

These feed solutions analyzed 0.157, 0.1578 and 0.162 M $Cu^{++}$, respectively. The extraction results are set forth in the following Table VI.

*Table VI*

| Extraction No. | Aqueous Feed Solution | Org./Aq. Phase Ratio | At Equilibrium (moles/l.) | |
|---|---|---|---|---|
| | | | [Cu⁺⁺] Aq. | [Cu⁺⁺] Org. |
| 1 | Exp. VI | 8 | 0.000755 | 0.0193 |
| 2 | Exp. VI | 4 | 0.000755 | 0.0386 |
| 3 | Exp. VI | 2 | 0.036 | 0.0595 |
| 4 | Exp. VI | 1.33 | 0.074 | 0.0608 |
| 5 | Exp. VI | 1 | 0.095 | 0.06 |
| 6 | Exp. VI | 0.67 | 0.114 | 0.0615 |
| 7 | Exp. VII | 8 | 0.0033 | 0.0190 |
| 8 | Exp. VII | 4 | 0.0066 | 0.0371 |
| 9 | Exp. VII | 2 | 0.0359 | 0.060 |
| 10 | Exp. VII | 1.33 | 0.073 | 0.0615 |
| 11 | Exp. VII | 1 | 0.0927 | 0.0623 |
| 12 | Exp. VII | 0.67 | 0.112 | 0.0645 |
| 13 | Exp. VIII | 8 | 0.012 | 0.0179 |
| 14 | Exp. VIII | 4 | 0.022 | 0.0333 |
| 15 | Exp. VIII | 2 | 0.048 | 0.0535 |
| 16 | Exp. VIII | 1.33 | 0.076 | 0.0593 |
| 17 | Exp. VIII | 1 | 0.095 | 0.06 |
| 18 | Exp. VIII | 0.67 | 0.115 | 0.06 |

The data of the above examples show that various anions have little, if any, effect on the extraction of copper values from ammonical solutions. This is highly advantageous since leach liquors which are contaminated with various anions can be extracted without difficulty using the process of the present invention.

EXAMPLE IX

A 0.4 molar solution of 5,8-diethyl-7-hydroxydodecan-6-oxime in kerosene was loaded with copper by shaking it with a portion of the aqueous ammonical feed solution of Example V at an aqueous:organic volume phase ratio of 2.0. Forty ml. of this solution was then shaken with 5 ml. of 3 M $H_2SO_4$, followed by shaking with 5 ml. $H_2O$. This cycling procedure was continued for three complete cycles and then the aqueous stripping solutions were analyzed for copper. This stripping procedure was conducted at ambient room temperature, 60° C. and 75° C. The results are set forth in Table VII.

*Table VII*

| | Cumulative Percent Cu⁺⁺ Stripped | | |
|---|---|---|---|
| | Room Temp. | 60° C. | 75° C. |
| 1st H₂SO₄ Stripping | 30.5 | 57.6 | 57.1 |
| 1st H₂O Stripping | 42.0 | 73.7 | 69.3 |
| 2nd H₂SO₄ Stripping | 62.8 | 94.4 | 85.3 |
| 2nd H₂O Stripping | 77.0 | 102.8 | 88.5 |
| 3rd H₂SO₄ Stripping | 83.6 | | |
| 3rd H₂O Stripping | 93.4 | | |

From the above data, it can be seen that copper values can be easily stripped from the loaded organic phase to yield a copper-pregnant aqueous solution suitable for direct electrolysis.

EXAMPLE X

A loaded organic phase (kerosene and 5,8-diethyl-7-hydroxydodecan-6-oxime) containing 0.0698 M $Cu^{++}$ was stripped with various aqueous HCl solutions and $H_2O$. The organic phase (10 ml.) was first contacted with 10 ml. of the HCl solution and then with 10 ml. $H_2O$. Results of this stripping procedure are set forth in the following table.

*Table VIII*

| Stripping No. | HCl Solution | Percent Cu⁺⁺ Stripped | | |
|---|---|---|---|---|
| | | HCl Solution | H₂O | Total |
| 1 | 2 M | 57.3 | 31.7 | 89 |
| 2 | 4 M | 57.3 | 42.7 | >100 |
| 3 | 6 M | 57.3 | 42.7 | >100 |
| 4 | 8 M | 64.5 | 35.5 | >100 |
| 5 | 10 M | 87.5 | 12.5 | >100 |
| 6 | 12 M | 93.0 | 7.0 | >100 |

It is to be understood that the invention is not to be limited to the exact details of operation or the exact processes shown and described, as obvious modifications and equivalents will be apparent to those skilled in the art and the invention is to be limited only by the scope of the appended claims.

The embodiments of the invention in which an exclusive property or privilege is claimed are defined as follows:

1. A process for the recovery of copper values from an aqeous solution comprising: (1) contacting said aqueous solution with an organic phase comprising a liquid hydrocarbon and an α-hydroxy oxime to extract at least a portion of the copper values into the organic phase, said oxime being characterized as having a solubility of at least 2% by weight in the liquid hydrocarbon and having the formula:

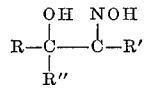

where R and R' are organic hydrocarbon radicals and R'' is selected from the group consisting of hydrogen and organic hydrocarbon radicals; (2) separating the resultant copper-pregnant organic phase from the resultant coper-barren aqueous phase; and (3) recovering the copper-pregnant organic phase.

2. A process as defined in claim 1 wherein the aqueous solution is derived from the ammonia leaching of copper containing ores.

3. A process as defined in claim 1 wherein the aqueous solution is derived from the acid leaching of copper containing ores.

4. A process as defined in claim 1 wherein R and R' are selected from the group consisting of unsaturated hydrocarbon and branched chain alkyl groups containing from about 6 to 20 carbon atoms.

5. A process as defined in claim 4 wherein R and R' are alkyl groups attached to the carbons substituted with the —OH and =NOH groups through a secondary carbon atom.

6. A process as defined in claim 4 wherein R'' is hydrogen.

7. A process as defined in claim 4 where R'' is selected from the group consisting of unsaturated hydrocarbon and branched chain alkyl groups containing from about 6 to 20 carbon atoms.

8. A process as defined in claim 1 wherein the α-hydroxy oxime contains a total of from about 14 to 40 carbon atoms.

9. A process as defined in claim 1 wherein the α-hydroxy oxime is 5,8-diethyl-7-hydroxydodecan-6-oxime.

10. A process as defined in claim 1 wherein the α-hydroxy oxime is 19-hydroxyhexatriaconta-9,27-dien-18-oxime.

11. A process as defined in claim 1 wherein the α-hydroxy oxime is 5,10-diethyl-8-hydroxytetradecan-7-oxime.

12. A process as defined in claim 1 wherein R'' is hydrogen and R and R' are branched chain alkyl groups containing 9 carbon atoms.

13. A process as defined in claim 1 wherein the organic phase contains from about 2 to about 50% by weight of the α-hydroxy oxime.

14. A process as defined in claim 1 wherein the liquid hydrocarbon is kerosene.

15. A process as defined in claim 1 wherein the organic phase also contains from about 0.5 to 10% by weight of an alpihatic alcohol as a conditioner.

16. A process as defined in claim 1 wherein the copper values are recovered from the copper-pregnant organic phase by contacting said phase with an aqueous stripping medium to strip the metal values from the copper-pregnant organic phase, separating the resulting copper-pregnant aqueous stripping medium from the organic phase and electrolyzing the copper-pregnant aqueous stripping medium.

17. A process as defined in claim 9 wherein the aqueous stripping medium comprises a mineral acid.

18. A process as defined in claim 1 wherein the copper values are recovered from the copper-pregnant organic phase by hydrogenation.

19. A process as defined in claim 1 wherein the copper values are recovered from the copper-pregnant organic phase by contacting said phase with an aqueous stripping medium containing a mineral acid to strip the metal values from the copper-pregnant organic phase, separating the resultant copper-pregnant aqueous stripping medium from the organic phase, and separating the copper values in the form of salts from the aqueous stripping phase.

20. A process as defined in claim 1 wherein the aqueous solution also contains other metal values.

References Cited by the Examiner
UNITED STATES PATENTS

| | | | |
|---|---|---|---|
| 2,330,239 | 9/1943 | Prutton | 260—438 |
| 2,377,267 | 5/1945 | Reiff. | |
| 2,777,874 | 1/1957 | Asseff | 260—438 |
| 2,892,681 | 6/1959 | Crandall | 23—312 |
| 2,909,542 | 10/1959 | Soloway | 260—429.1 |
| 2,993,782 | 7/1961 | Hampton | 75—117 |
| 3,088,798 | 5/1963 | Fetscher | 260—429.1 |
| 3,088,799 | 5/1963 | Fetscher | 260—429.1 |
| 3,104,971 | 9/1963 | Olson | 75—108 |

BENJAMIN HENKIN, *Primary Examiner.*

UNITED STATES PATENT OFFICE
CERTIFICATE OF CORRECTION

Patent No. 3,224,873                      December 21, 1965

Ronald R. Swanson

It is hereby certified that error appears in the above numbered patent requiring correction and that the said Letters Patent should read as corrected below.

Column 2, lines 49 to 54, the formula should appear as shown below instead of as in the patent:

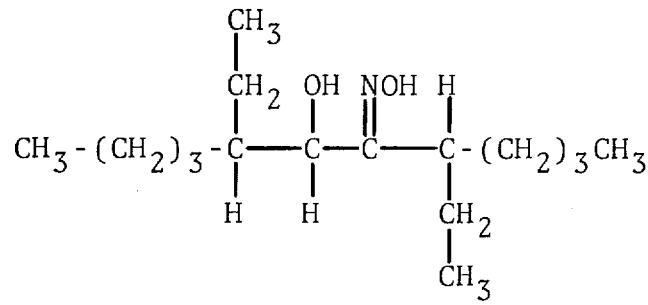

column 3, line 49, for "usisng" read -- using --; column 8, line 23, for "aqeous" read -- aqueous --; same column 8, lines 30 to 33, the formula should appear as shown below instead of as in the patent:

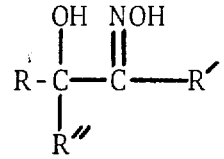

column 9, line 5, for "alpihatic" read -- aliphatic --; line 10, for "resulting" read -- resultant --.

Signed and sealed this 29th day of November 1966.

(SEAL)
Attest:

ERNEST W. SWIDER                      EDWARD J. BRENNER
Attesting Officer                   Commissioner of Patents